Jan. 17, 1956  J. S. PRENER  2,731,423
ELECTROLUMINESCENT MATERIALS AND METHOD OF PREPARATION
Filed Sept. 8, 1951
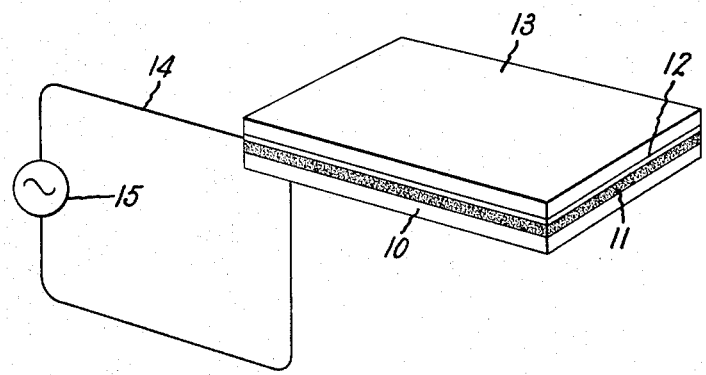
Inventor:
Jerome S. Prener,
by Paul A. Frank
His Attorney.

United States Patent Office 2,731,423
Patented Jan. 17, 1956

2,731,423

ELECTROLUMINESCENT MATERIALS AND METHOD OF PREPARATION

Jerome S. Prener, Schenectady, N. Y., assignor to General Electric Company, a corporation of New York Application September 8, 1951, Serial No. 245,696

16 Claims. (Cl. 252—301.6)

This invention relates to electroluminescent materials and a method for the preparation thereof. More particularly, it relates to an electroluminescent phosphor in which selenium is present and which has been subjected to a treatment to remove zinc oxide and excess copper. As part of the treatment, this invention contemplates heating the phosphor material under conditions which will enhance the brightness of the phosphor.

In electroluminescence light is emitted without the evolution of significant quantities of heat. A device for creating such light is sometimes referred to as a luminous condenser or capacitor. A luminous condenser is comparable to a normal flat plate condenser except that one of the plates is transparent and the space between plates is occupied by an electroluminescent phosphor which emits light visible through the transparent plate when the condenser is subjected to an alternating electric field. In the present development of the art, light produced by a luminous condenser is of a low order as compared with light produced by incandescence or fluorescence.

Accordingly, it is an object of this invention to produce an electroluminescent phosphor giving improved brightness.

It is another object of this invention to provide an electroluminescent phosphor in which selenium is one of the constituents.

A further object of this invention is to provide a method of preparing an electroluminescent phosphor wherein zinc oxide initially present in the mixture is removed.

A still further object of the invention is to provide a method for removing excess copper from an electroluminescent phosphor.

Another object of the invention is to provide a method for heat treating a phosphor during the preparation thereof.

Other objects will become apparent and the invention better understood from a consideration of the following description taken in conjunction with the accompanying drawing of a luminous condenser.

As shown on the drawing, a luminous condenser or capacitor comprises a base conductor 10, a layer of dielectric 11 in which a phosphor is suspended, a transparent conductor 12 in contact with the dielectric layer 11, and a transparent supporting plate 13 in contact with the transparent conducting layer 12. The transparent conductor 12 and base conductor 10 are connected by a circuit 14 through an alternating current generator 15. The intensity of illumination given off by the phosphor in the dielectric layer 11 is dependent upon the frequency and voltage generated by the alternating current generator 15.

In the drawing the thickness of some of the layers is exaggerated. Thus the dielectric layer 11 is of the order of 3 to 5 mils in thickness. The transparent conducting layer 12, which may be stannic oxide after the manner of so-called "conducting glass," may be of the order of a thousand angstrom units in thickness. The supporting plate 13 may be omitted since it is not required in order for the capacitor to function. However, it is very desirable to provide the support and protection afforded by the plate 13, which may be composed of glass or a transparent plastic.

The dielectric layer 11 in which the phosphor is suspended should preferably have a high dielectric constant.

My invention is directed particularly toward the phosphor which is embedded or suspended in the dielectric layer 11. I have provided a phosphor giving enhanced brightness characteristics by including selenium as one of the constituents of the phosphor mix and by removing zinc oxide and excess copper during the process of manufacturing my improved phosphor. At the same time I incorporate in my method of manufacture a step which introduces a small quantity of oxygen or other oxidizing agent to the phosphor.

An electroluminescent phosphor composed of zinc sulfide and zinc oxide with a small quantity of copper as an activator will give a blue emission. I have found that if zinc selenide is included as one of the components, the brightness of the emission is considerably enhanced and in addition the emission is shifted toward the green. I have also found that if the zinc oxide initially present is removed from the phosphor, the subsequent emission is much brighter. I have found that washing the phosphor mixture with a weak acid solution will dissolve out the zinc oxide without affecting the other constituents present.

The copper activator is a most important component of the phosphor. However, if copper is present in excess, the capacitor becomes conducting and gives off heat. I have found that if the copper is initially present in excess, treatment with cyanide will remove the excess copper thereby enabling the cell to emit at maximum brilliance without becoming unduly conductive.

I have further discovered that if the phosphor is fired for a short time in an oxidizing atmosphere, the electroluminescent effect is enhanced.

While any proportions of a properly mixed phosphor containing zinc sulfide, zinc selenide, zinc oxide and copper activator will be luminescent to some degree, I have found that best results are achieved where the proportion of zinc sulfide to zinc selenide is in the ratio of 3 or 4 to 1. The brightness characteristics of the phosphor decline if this proportion is increased appreciably or decreased. A very satisfactory result is achieved where the proportions of the ingredients are of the order of 60 zinc sulfide: 15 zinc selenide: 25 zinc oxide: and about 0.5 copper.

I have also found that desirable characteristics are imparted to the phosphor where it has been fired at about 1100° C. or above.

The following steps outline a preferred method of preparing a phosphor in accordance with this invention:

1. 60 grams of pure zinc sulfide, 15 grams of zinc selenide, 25 grams of pure zinc oxide and 1.90 grams of copper nitrate trihydrate (equivalent to 0.5 gram copper) are thoroughly mixed together as by ball milling.

2. The mixed ingredients are fired for 30 minutes in a flowing dry nitrogen atmosphere at 1150° C.

3. The product, which is dark grayish brown in color, is reground and then refired in a static air atmosphere for 30 minutes at 1150° C. The product remains grayish brown in color.

4. The product from the second firing is then washed with a boiling 50% solution of glacial acetic acid in distilled water. A sufficient quantity of solution is used so that substantially all the zinc oxide present will be decomposed and removed from the phosphor powder. Such an acid solution does not dissolve any appreciable amounts of the zinc sulfo-selenide solid solution. The phosphor is then thoroughly washed with distilled water. The product is still grayish brown, but has lost 25 grams in weight, equivalent to the zinc oxide present in the original mixture.

5. This product is then washed in about 300 cc. of a 10% sodium or potasium cyanide solution. The color of the phosphor immediately becomes light tan. The phosphor is then washed with distilled water to remove the cyanide and then dried at 110° C. It is then ready for use.

Many of the above conditions are not critical and one skilled in the art can think of many variations which will give equally satisfactory results. For example, in step 1, the copper does not have to be introduced as copper nitrate trihydrate. In steps 2 and 3, the 30-minute interval specified may be varied widely without interfering with the production of a satisfactory product. In step 4 other acids than glacial acetic may be utilized to remove the zinc oxide. In step 5 sodium and potassium cyanide solutions are specified since they are the cyanide salts most readily obtainable. However, other cyanides may be substituted to give equally satisfactory results.

My invention provides an electroluminescent phosphor having enhanced emission characteristics. It is my intention to cover all changes and modifications of the example of the invention herein chosen for exemplary purposes which do not constitute departures from the spirit and scope of the invention as defined in the appended claims.

What I claim as new and desire to secure by Letters Patent of the United States is:

1. An electroluminescent phosphor comprising a zinc oxide removed remainder of a fired mixture of about 60 parts zinc sulfide, 15 parts zinc selenide, 25 parts zinc oxide and about 0.5 part copper.

2. The method of producing an electroluminescent phosphor which comprises heating a mixture of zinc sulfide, zinc selenide, zinc oxide, and copper compound, the zinc sulfide-zinc selenide ratio being 3–4:1, the zinc oxide comprising about 25% of the mixture, and the copper compound being in amount to yield about 0.5% copper in the mixture, to a temperature of about 1100° C., and dissolving the zinc oxide from the product by treatment with a mild acid.

3. The method of producing a phosphor as claimed in claim 2 wherein the mixture is first heated to a temperature of about 1100° C. in an atmosphere of inert gas and then in an oxidizing atmosphere.

4. The method of claim 3 wherein the inert gas is nitrogen.

5. The method of claim 3 wherein the mixture is heated in the atmosphere of inert gas for about one-half hour and then in the atmosphere containing oxygen for about one-half hour.

6. The method of claim 3 wherein the zinc oxide is dissolved out of the product by 50% acetic acid.

7. The method of producing an electroluminescent phosphor which comprises heating a mixture containing about 60 parts zinc sulfide, 15 parts zinc selenide, 25 parts zinc oxide and sufficient copper compound to yield about 0.5 part copper to a temperature of about 1100° C., and dissolving the zinc oxide from the product by treatment with a mild acid.

8. The method of producing a phosphor as claimed in claim 7 wherein the mixture is first heated to a temperature of about 1100° C. in an atmosphere of inert gas and then in an atmosphere containing oxygen.

9. The method of claim 7 wherein the inert gas is nitrogen.

10. The method of claim 7 wherein the mixture is heated in an atmosphere of inert gas for about one-half hour and then in an oxidizing atmosphere for about one-half hour.

11. The method of claim 7 wherein the zinc oxide is dissolved out of the product by 50% acetic acid.

12. The method of producing an electroluminescent phosphor which comprises heating a mixture containing about 60 parts zinc sulfide, 15 parts zinc selenide, 25 parts zinc oxide and sufficient copper compound to yield about 0.5 part copper to a temperature of about 1100° C., dissolving the zinc oxide from the product by treatment with a mild acid, and then washing the mixture in a cyanide salt solution.

13. The method of producing an electroluminescent phosphor which comprises heating a mixture of zinc sulfide, zinc selenide, the ratio of zinc sulfide to zinc selenide being 3 to 4 parts by weight zinc sulfide to 1 part zinc selenide, approximately 25% by weight of zinc oxide, and about 0.5% copper to a temperature of about 1100° C. in an inert atmosphere for about one-half hour, reheating to a temperature of about 1100° C. in an atmosphere containing oxygen for about one-half hour, washing the mixture in a boiling 50% solution of acetic acid, and further washing the mixture in a dilute solution of a compound selected from the group consisting of sodium cyanide and potassium cyanide.

14. An electroluminescent phosphor comprising the zinc oxide removed remainder of a fired mixture of zinc sulfide, zinc selenide, zinc oxide, and an activator comprising copper, in which the zinc sulfide to zinc selenide ratio is 3–4:1, the removed zinc oxide originally comprises about 25% of the mixture, and the copper is about 0.5% of the fired mixture.

15. An electroluminescent phosphor produced by firing at about 1100° C. a mixture of about 60 parts zinc sulfide, 15 parts zinc selenide, 25 parts zinc oxide, and sufficient copper compound to yield in the mixture about 0.5 part copper, washing the fired mixture with acetic acid, and washing the fired mixture with a dilute solution of a compound selected from the group consisting of sodium cyanide and potassium cyanide.

16. The method of producing an electroluminescent phosphor which comprises heating a mixture of about 60 parts zinc sulfide, 15 parts zinc selenide, 25 parts zinc oxide, and sufficient copper compound to yield in the mixture about 0.5 part copper to a temperature about 1100° C. in an inert atmosphere for about ½ hour, reheating to a temperature of the order of 1100° C. in an atmosphere containing oxygen for about ½ hour, washing the mixture in a boiling solution of acetic acid, and further washing the mixture in a dilute solution of a compound selected from the group consisting of sodium cyanide and potassium cyanide.

References Cited in the file of this patent

UNITED STATES PATENTS

| | | |
|---|---|---|
| 2,531,618 | Georghegan | Nov. 28, 1950 |
| 2,546,239 | Rothschild | Mar. 27, 1951 |

OTHER REFERENCES

Proc. I. R. E. 32, 1944, page 260. (Copy in Sci. Lib.)

G. Destriau: The New Phenomenon of Electrophotoluminescence, Philosophical Magazine, vol. 38. (Copy in Sci. Lib.)